United States Patent Office 3,331,841
Patented July 18, 1967

3,331,841
CERTAIN DERIVATIVES OF 2-AMINO-5-ALKOXYPYRIMIDINE
Hans Priewe and Klaus Gutsche, Berlin, Germany, assignors to A.G. Schering, Berlin, Germany
No Drawing. Filed Mar. 10, 1964, Ser. No. 350,696
3 Claims. (Cl. 260—256.4)

This invention relates to derivatives of 2-aminopyrimidine, and more particularly to compounds of the formula

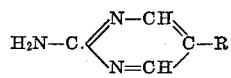

wherein R may be a lower alkoxy radical, a lower alkoxy-lower alkyl radical, a lower alkoxy-lower alkovy radical, a lower alkoxy-lower alkoxy-lower alkoxy radical, a cycloalkoxy radical, or a tetrahydrofurfuryloxy radical, and to methods of preparing the compounds.

The afore-described compounds are useful intermediates in the synthesis of sulfonamide compounds which are effective agents for lowering the blood sugar level. The synthesis of sulfonamide compounds from the compounds of the instant invention has been disclosed and claimed in our copending application, Ser. No. 144,530 filed on Oct. 12, 1961, now Patent No. 3,275,635, issued Sept. 27, 1966, of which the instant application is a division and continuation-in-part.

We have also found that the aminopyrimidine derivatives of this invention have very low toxicity and are capable of preventing or reducing liver damage by carbon tetrachloride. The aminopyrimidine derivatives of the invention are also effective addition agents in electroplating solutions for refining the grains of the deposited metal, and for increasing the luster of the deposits.

It has furthermore, been established that the aminopyrimidines of the invention accelerate the curing of epoxy resins by hardeners of the polyaminoamide and polyaminoimidazoline type. The compounds of the invention, when admixed to epoxy resin compositions in amounts of approximately one percent by weight, reduce the curing time by about 25 percent. They are non-volatile, non-toxic, and readily compatible with the synthetic resin. This combination of properties was not heretofore available in a curing accelerator for the afore-described epoxy resin compositions.

Other features and advantages of the invention will become apparent to those skilled in the art as the disclosure proceeds.

The compounds of this invention are preferably prepared by reacting a compound of the formula

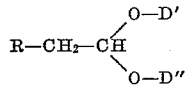

with a Vilsmeier condensation agent having a reactive halogen until one of the groups D'—O and D"—O is replaced by halogen. The reaction product is then reacted with a formamide of the formula $D_1D_2$=N—CHO. In these formulas, R has the meaning defined hereinabove wherein D', D" are lower alkyl radicals, $D_1$ is an alkyl radical, and $D_2$ is an alkyl radical or a phenyl radical. There is obtained an intermediate product which forms the desired 2-aminopyrimidine compound upon reaction with a guanidine salt in an alkaline medium. Phosphorus pentachloride is the preferred Vilsmeier condensation agent.

The following examples are further illustrative of the present invention and it will be understood that the invention is not limited thereto:

Example 1

210 g. phosphorus pentachloride were gradually added to 252 g. methoxyethoxyacetaldehyde-di-methoxyethylacetal with agitation. The mixture was externally cooled with ice to hold the reaction temperature below 25° C. Moisture was carefully excluded. After addition of the condensation agent was completed, the reaction mixture was further agitated at room temperature for 30 minutes. 225 ml. dimethylformamide were then added drop by drop while the reaction temperature was held at 20 to 25° C. by external cooling of the reaction vessel with ice. When the dimethylformamide had been added, the temperature was raised to 60° C., and this temperature was maintained for 70 minutes.

The temperature was again lowered to 20–25° C. and maintained at this value by cooling with ice while 500 ml. methanol were added drop by drop. The resulting solution was admixed drop by drop to a suspension of 240 g. powdered caustic soda in 800 ml. methanol at 20 to 25° C. After mixing was completed, stirring was continued for 30 minutes at room temperature. The solution now contained inorganic salts and β-dimethylamino-α-methoxyethoxyacroleine.

200 g. guanidine nitrate and thereafter 70 g. sodium hydroxide were added to the solution. The methanol was evaporated with agitation. The residue was dissolved in 1.5 liters of water and was repeatedly extracted with chloroform. The combined chloroform extracts were evaporated to dryness, and the residue was recrystallized from carbon tetrachloride. 80 grams of 2-amino-5-methoxyethoxypyrimidine of M.P. 80–81° C. were obtained.

Example 2

324 g. 1,1,3-tricyclohexyloxyethane when subjected to the sequence of steps of Example 1 instead of methoxyethoxyacetaldehyde-di-methoxyethylacetal yielded 88 g. 2-amino-5-cyclohexyloxypyrimidine of M.P. 72–73° C.

Example 3

430 g. ethoxyethoxyethoxyacetaldehyde - di - ethoxyethoxyethylacetal were reacted with phosphorus pentachloride, dimethylformamide, and guanidine nitrate in the same manner as set forth in Example 1. The crude base obtained by the chloroform extraction was dissolved in dilute hydrochloric acid and the acid solution was repeatedly extracted with ether. The aqueous phase was made alkaline with sodium hydroxide and was extracted with chloroform. The chloroform extract was evaporated and 175 g. 2-amino - 5 - ethoxyethoxyethoxypyrimidine were obtained as a brown oil.

The base was transformed for identification into the corresponding benzenesulfonyl compound of M.P. 118–119° C. by reaction with benzenesulfochloride in pyrimidine solution.

Example 4

330 g. tetrahydrofurfuryloxyacetaldehyde - di - tetrahydrofurylacetal when subjected to the reaction sequence of Example 3 yielded 130 g. 2-amino-5-tetrahydrofurfuryloxypyrimidine which is a brown oil. The corresponding benzenesulfonyl derivative melts at 213–215° C.

In an analogous manner are prepared 2-amino-5-R-pyrimidines wherein R is methoxyethoxy, methoxymethyl, or ethoxymethyl radicals.

The guanidine nitrate mentioned in Examples 1 to 4 may be replaced by another guanidine salt which reacts as the free guanidine base in an alkaline medium.

Example 5

1,1,2-triethoxyethoxyethane was prepared from chloroacetaldehyde-diethoxyethyl acetal by reaction with the sodium compound of ethylene glycol monoethylether and had a boiling point of 170° C. at 11mm. Hg. 30 grams 1,12-triethoxyethoxyethane were dissolved in 100 milliliters methylene chloride. 27.5 grams phosgene were absorbed in the solution while the same was held at 30° C. The solution was further cooled to —5° C., and 23 milliliters dimethylformamide were added drop by drop with agitation.

Stirring of the mixture was continued at the low temperature for one hour. The methylene chloride was then distilled off at 70° C., and the residue was maintained at about 65° C. for about 45 minutes. It was then cooled to 20° C., and 120 milliliters methanol, 20 grams guanidine nitrate, and 30 grams sodium hydroxide were admixed in sequence with external cooling. The methanol was distilled off, and the distillation residue was extracted repeatedly with perchlorethylene. The combined extracts were evaporated to dryness, and the residue was recrystallized from carbon tetrachloride.

There were obtained 12 grams 2-amino-5-ethoxy-ethoxypyrimidine having a melting point of 47–49° C.

*Example 6*

1,1,2 - triisopropoxyethoxyethane was prepared from chloroacetaldehyde-diisopropoxyethylacetal and the sodium compound of ethylene-glycol monoisopropyl ether. B.P.$_2$ 150° C. 34 grams of the 1,1,2-triisopropoxyethoxyethane were subjected to a sequence of reactions analogous to those of Example 5, and there were obtained 13 grams 2-amino-5-isopropoxyethoxypyrimidine, having a melting point of about 35° C., and a boiling point of 135–140° C. at 0.01 mm. Hg.

*Example 7*

When 1,1,2-triethoxyethoxyethane was subjected to the sequence of steps described in Example 1, there was obtained 2-amino-5-ethoxy-ethoxy pyrimidine of melting point 47–49° C.

*Example 8*

Methoxypropionaldehyde - dimethylacetal was substituted in the method of Example 1 for an equivalent amount of the methoxyethoxyacetaldehyde-di-methoxyethylacetal. 2-amino-5-methoxymethylpyrimidine of melting point 124–126° C. was obtained in a corresponding yield.

*Example 9*

Ethoxypropionaldehyde-di-ethylacetal, when employed in the method of Example 1, yielded 2-amino-5-ethoxymethylpyrimidine of M.P. 130–132° C.

*Example 10*

The toxicity of 2-amino-5-methoxyethoxypyrimidine was evaluated on rats and mice by injecting solutions of the compound, and by determining the amount of compound in grams per kilogram of body weight of the test animals which killed one half of the animals (LD$_{50}$). One half of the rats were found to survive the intravenous injection of 2 - amino - 5 - methoxyethoxypyrimidine in amounts of 2.1 grams per kilogram. LD$_{50}$ for mice was found to be 1.5 grams per kilogram when injected intravenously. Intraperitoneal injection in mice gave an LD$_{50}$ value of 1.7 grams per kilogram.

Similarly low toxicity was found in the other compounds of the invention.

*Example 11*

The protection afforded to the liver of test animals against injury by carbon tetrachloride was demonstrated in the following manner:

Pure bred, male Spargue-Dawley rats weighing between 150 and 200 grams each, were poisoned by intraperitoneal application of 5 milliliters CCl$_4$ per kilogram of body weight. The liver damage caused by the solvent was evaluated 17 hours after the injection by the determination of serum glutamate pyruvate transaminase activity (SGPT activity). Comparison tests were made under otherwise identical conditions with a group of untreated controls, and with animals which had received 300 milligrams 2-amino-5-methoxyethoxypyrimidine per os for each kilogram of body weight one hour prior to carbon tetrachloride poisoning.

The following results were obtained:

| | SGPT activity |
|---|---|
| Controls | 6 |
| CCl$_4$ only | 756 |
| CCl$_4$ after 2-amino-5-methoxyethoxypyrimidine | 181 |

*Example 12*

A conventional copper plating solution was prepared from 250 grams copper sulfate crystals and 20 grams sulfuric acid with enough water to make one liter. The solution was held at about 30° C., and a sufficient direct current voltage was applied to a copper anode and a polished steel cathode in the solution to pass current through the bath at a cathode current density of about 20 amperes per square foot. A copper deposit was formed on the cathode. The bright finish of the base metal was completely obscured before the copper deposit reached a thickness of 0.0001″. The deposit had a dull reddish appearance.

When one gram of 2-amino-5-methoxyethoxypyrimidine was added to the plating solution, and another polished steel plate was plated in the manner described above, the copper plate was as bright as the base metal regardless of the thickness of the electrodeposit. It was also found that the throwing power of the acid copper plating solution was substantially improved. An object of the irregular surface configuration was completely covered with copper when plate in the modified bath of the invention, whereas recesses in an identical object plate in the conventional bath under otherwise the same conditions remained bare.

*Example 13*

A conventional Watts type nickel plating solution was prepared from 250 grams nickel sulfate crystals, 50 grams nickel chloride crystals, 40 grams boric acid, and enough water to make one liter of solution. As little as 0.08–0.1 gram 2-amino-5-methoxyethoxypyrimidine added to the bath were sufficient to produce semi-bright smooth nickel deposits at about 50° C. and 20 amperes per square foot, whereas the usual dull deposits were formed in the absence of the brightening agent of the invention.

In the presence of auxiliary brighteners such as naphthalene-1,5-disulfonic acid, alpha and beta-naphthalene monosulfonic acids, o-toluidine disulfonic acid, diphenyl sulfonates, p-toluene sulfonamide, o-benzoyl sulfimide, and related compounds, well known in themselves, the brightening agents of the invention produced mirror-bright deposits over a wide range of operating conditions. The auxiliary brighteners are preferably employed in amounts of 0.5 to 3.0 grams per liter.

The cooperation of the brightening agents of the invention with the various sulfur bearing known auxiliary brighteners not only increases the brightness of the nickel deposit beyond that obtainable with the sulfur bearing compounds alone, but the brightening agents of the invention also have a very characteristic leveling effect so that irregularities of the base metal surface are not reproduced on the bright nickel surface.

Similar brightening effects are achieved with 2-aminopyrimidine derivatives having other radicals containing one or more oxygen atoms in a straight chain such as ethoxyethoxyethoxy radicals or cyclic groups such as a tetrahydrofurfuryloxy or cyclohexyloxy radical in position 5.

The concentration of the brightening agents of the invention is not overly critical. They are effective in unusually low amounts, and their present in concentrations greater than those required for best results do not adversely affect the brightness of the deposit.

Example 14

A mixture was prepared from 65 parts of an epoxy resin and 35 parts of a polyaminoimidazoline derived from dimeric fatty acids and triethylenetetramine. The epoxy resin was of the conventional type prepared by condensation of Bisphenol A with epichlorohydrine. One part by weight of 2-amino-5-methoxy ethoxypyrimidine was uniformly distributed in a portion of the mixture.

The two compositions obtained were suitable for the potting of electronic components, for the casting of complex shapes, as adhesives, and as surface coatings. Under all conventional curing conditions of temperature and pressure, the composition containing the 2-amino-5-methoxypyrimidine was fully cured in about three quarters of the time required for the curing of the composition not containing the 2-amino-5-methoxyethoxypyrimidine.

The other 5-substituted-2-aminopyrimidines of the invention were similarly effective in accelerating the curing of the epoxy resin.

While the invention has been described with particular reference to specific embodiments, it is to be understood that it is not limited thereto, but is to be construed broadly, and restricted solely by the scope of the appended claims.

We claim:
1. 2-amino-5-cyclohexyloxypyrimidine.
2. 2-amino-5-ethoxyethoxyethoxypyrimidine.
3. 2-amino-5-tetrahydrofurfuryloxypyrimidine.

References Cited

UNITED STATES PATENTS

| | | | |
|---|---|---|---|
| 2,506,351 | 5/1950 | English et al. | 260—256.5 |
| 2,932,610 | 4/1960 | Robinson | 204—49 |
| 2,937,978 | 5/1960 | Strauss et al. | 204—49 |
| 3,060,183 | 10/1962 | Clark et al. | 260—256.4 |
| 3,085,075 | 4/1963 | Lockshin et al. | 260—18 |
| 3,099,634 | 7/1963 | Meigs | 260—18 |
| 3,108,105 | 10/1963 | Staeuble | 260—256.4 |
| 3,203,951 | 8/1965 | Diedrich | 260—256.5 |
| 3,207,758 | 9/1965 | Worffel et al. | 260—256.5 |

OTHER REFERENCES

Braker et al.: Jour. Amer. Chem. Soc., vol. 69, 1947, pp. 3072–3078.

ALEX MAZEL, *Primary Examiner.*

HENRY R. JILES, *Examiner.*

MARY O'BRIEN, RICHARD J. GALLAGHER, *Assistant Examiners.*